United States Patent [19]

Sorriero et al.

[11] Patent Number: 5,266,429
[45] Date of Patent: Nov. 30, 1993

[54] POLYESTER-IMIDES IN ELECTROPHOTOGRAPHIC ELEMENTS

[75] Inventors: Louis J. Sorriero; Ralph H. Young; Teh-Ming Kung, all of Rochester; Joseph A. Pavlisko, Pittsford, all of N.Y.

[73] Assignee: Eastman Kodak Company, Rochester, N.Y.

[21] Appl. No.: 992,304

[22] Filed: Dec. 21, 1992

[51] Int. Cl.$^5$ .................. G03G 5/047; G03G 5/087
[52] U.S. Cl. .......................... 430/58; 430/59; 430/96
[58] Field of Search ................... 430/58, 59, 96

[56] References Cited

U.S. PATENT DOCUMENTS

| | | | |
|---|---|---|---|
| 4,668,600 | 5/1987 | Lingnau | 430/83 |
| 4,687,834 | 8/1987 | Bartmann et al. | 528/291 |
| 4,971,873 | 11/1990 | Pavlisko et al. | 430/58 |
| 4,992,349 | 2/1991 | Chen et al. | 430/58 |

FOREIGN PATENT DOCUMENTS 3814647 4/1988 Fed. Rep. of Germany .
3110219 10/1986 Japan .

*Primary Examiner*—Roland Martin
*Attorney, Agent, or Firm*—Ann B. Kiernan

[57] ABSTRACT

An electrophotographic element comprises a polyester-imide that includes a dioxy component and a dicarbonyl component, one of which components contains an aromatic tetracarbonyldiimide group, and has the formula

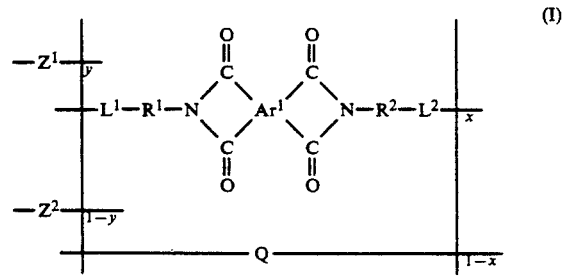

wherein $Ar^1$ represents a tetravalent aromatic group having 6 to about 20 carbon atoms, $R^1$ and $R^2$ each independently represents an alkylene group having 2 to about 12 carbon atoms, $L^1$ and $L^2$ represent O or C=O; when $L^1$ and $L^2$ are O, $Z^1$ and $Z^2$ each independently represents an aromatic or aliphatic dicarbonyl group having about 4 to about 12 carbon atoms and Q represents an alkylenedioxy group having 2 to about 25 carbon atoms or

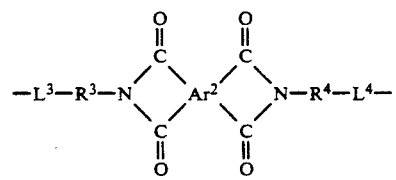

wherein $Ar^2$ represents a tetravalent aromatic group having 6 to about 20 carbon atoms that may be the same as or different from $Ar^1$, $R^3$ and $R^4$ each independently represents an alkylene group having 2 to about 12 carbon atoms; and $L^3$ and $L^4$ are O; or when $L^1$ and $L^2$ are C=O, $Z^1$ and $Z^2$ each independently represent an alkylenedioxy group having 2 to about 25 carbon atoms and (Abstract continued on next page.)

Q represents an aromatic or aliphatic dicarbonyl group having about 4 to about 12 carbon atoms or

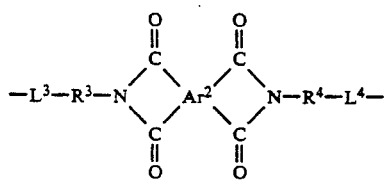

wherein Ar$^2$, R$^3$ and R$^4$ are as defined above, and L$^3$ and L$^4$ are C=O; x represents the mole fraction of the dioxy or dicarbonyl component of the polyester-amide that contains the tetravalent aromatic group Ar$^1$, and y represents the mole fraction of the dioxy or dicarbonyl component of the polyester-imide that contains Z$^1$, wherein x is 0.05 to 1 and y is 0 to 0.95.

19 Claims, No Drawings

POLYESTER-IMIDES IN ELECTROPHOTOGRAPHIC ELEMENTS

FIELD OF THE INVENTION

This invention relates to electrophotographic elements containing polyester-imides and, more particularly, to electrophotographic elements in which the polyester-imides are situated in charge-transport layers.

BACKGROUND OF THE INVENTION

In electrophotography an image comprising a pattern of electrostatic potential (also referred to as an electrostatic latent image), is formed on a surface of an electrophotographic element comprising at least an insulative photoconductive layer and an electrically conductive substrate. The electrostatic latent image is usually formed by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

In latent image formation the imagewise discharge is brought about by the radiation-induced creation of electron/hole pairs, which are generated by a material (often referred to as a charge-generation material) in the electrophotographic element in response to exposure to the imagewise actinic radiation. Depending upon the polarity of the initially uniform electrostatic potential and the type of materials included in the electrophotographic element, either the holes or the electrons that have been generated migrate toward the charged surface of the element in the exposed areas and thereby cause the imagewise discharge of the initial potential. What remains is a non-uniform potential constituting the electrostatic latent image.

Many electrophotographic elements currently in use are designed to be initially charged with a negative polarity. Such elements contain material which facilitates the migration of positive holes toward the negatively charged surface in imagewise exposed areas in order to cause imagewise discharge. Such material is often referred to as a hole-transport agent. In elements of that type, positively charged toner material is then used to develop the remaining imagewise unexposed portions of the negative polarity potential, i.e., the latent image, into a toner image. Because of the wide use of negatively charging elements, considerable numbers and types of positively charging toners have been fashioned and are available for use in electrographic developers.

However, for some applications of electrophotography it is more desirable to be able to develop the surface areas of the element that have been imagewise exposed to actinic radiation, rather than those that remain imagewise unexposed. For example, in laser printing of alphanumeric characters it is more desirable to be able to expose the relatively small percentage of surface area that will actually be developed to form visible alphanumeric toner images, rather than waste energy exposing the relatively large percentage of surface area that will constitute undeveloped background portions of the final image. In order to accomplish this while still employing widely available high quality positively charging toners, it is necessary to use an electrophotographic element that is designed to be positively charged. Positive toner can then be used to develop the exposed surface areas, which will have, after exposure and discharge, relatively negative electrostatic potential compared to the unexposed areas, where the initial positive potential will remain. An electrophotographic element designed to be initially positively charged preferably contains an adequate electron-transport agent, that is, a material which facilitates the migration of photogenerated electrons toward the positively charged insulative element surface.

Electrophotographic elements include both those commonly referred to as single layer or single-active-layer elements and those commonly referred to as multiactive, multilayer, or multi-active-layer elements.

Single-active-layer elements are so named because they contain only one layer that is active both to generate and to transport charges in response to exposure to actinic radiation. Such elements typically comprise at least an electrically conductive layer in electrical contact with a photoconductive layer. In single-active-layer elements, the photoconductive layer contains a charge-generation material to generate electron/hole pairs in response to actinic radiation and an electron-transport material, which comprises one or more of chemical compounds capable of accepting electrons generated by the charge-generation material and transporting them through the layer to effect discharge of the initially uniform electrostatic potential. The photoconductive layer is electrically insulative except when exposed to actinic radiation, and it sometimes contains an electrically insulative polymeric film-forming binder, which may itself be the charge-generating material, or it may be an additional material that is not charge-generating. In either case, the electron-transport agent is dissolved or dispersed as uniformly as possible in the binder film.

Multiactive elements are so named because they contain at least two active layers, at least one of which is capable of generating charge, i.e., electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). Such elements typically comprise at least an electrically conductive layer, a CGL, and a CTL. Either the CGL or the CTL is in electrical contact with both the electrically conductive layer and the remaining CTL or CGL. The CGL contains at least a charge-generation material; the CTL contains at least a charge-transport agent; and either or both layers can contain an electrically insulative film-forming polymeric binder.

In solvent-coating a photoconductive layer of a single-active-layer element or a CGL and/or CTL of a multiactive element of the invention, a film-forming polymeric binder can be employed. If it is electrically insulating, the binder can help provide the element with electrically insulating characteristics. It also is useful for coating the layer and for adhering the layer to an adjacent layer. When it is a top layer, the polymeric binder provides a smooth, easy to clean, wear-resistant surface.

Binder polymers should provide little or no interference with the generation or transport of charges in the layer. Examples of binder polymers which are especially useful include bisphenol A polycarbonates and polyesters such as poly[(4,4'-norbornylidene) diphenylene terephthalate-co-azelate].

Electron mobility, a measure of the rate at which electrons migrate through the CTL, is defined as their velocity divided by the strength of the electric field. In general, the greater the electron mobility, the faster the electrophotographic process can be carried out.

Electrophotographic elements whose CTLs contain conventional binder polymers and anthraquinone bis-cyanoimine compounds as electron-transport agents exhibit good sensitometric properties; however electron mobility in such materials is low. A new type of binder polymer which enhances electron mobility without adversely affecting the above mentioned properties would be highly desirable. A binder polymer which can additionally function to transport electrons in a CTL containing no monomeric electron-transport agent would also be very useful. The present invention achieves these beneficial objectives.

Diimide compounds, both monomeric and polymeric, that contain aromatic tetracarbonyl groups are well known in the art and find use in various applications, including electrophotography. U.S. Pat. No. 4,992,349, for example, discloses monomeric naphthalenetetracarboxylic diimides as electron-transport agents in charge transport layers of electrophotographic elements. U.S. Pat. No. 4,668,600 discloses perylenetetracarboxylic diimides as n-type conducting pigments in a photoconductive layer of an electrophotographic recording material. U.S. Pat. No. 4,971,873 also discloses an electrophotographic element containing perylenetetracarboxylic diimide pigment in the charge generation layer and a polymeric binder that is a benzene tetracarboxylic polyarylimide that contains an indane group.

A method of preparing polyester-imides by reaction of tetracarboxylic acid dianhydrides with hydroxyalkyldicarboxylic acid amides is disclosed in U.S. Pat. No. 4,687,834. Japanese Patent Application J6 3110219 discloses a process of polycondensing perylenetetracarboxylic dianhydrides with aromatic diamines. Polymeric perylenetetracarboxylic diarylimides are disclosed as dyestuffs in DE 3,814,647.

SUMMARY OF THE INVENTION

An electrophotographic element of the present invention comprises a polyester-imide that contains a dioxy component and a dicarbonyl component, one of which components contains an aromatic tetracarbonyl-diimide group, and that comprises the condensation product from a mixture comprising a diol compound and a dicarboxylic acid ester, anhydride, or chloride compound and has the formula

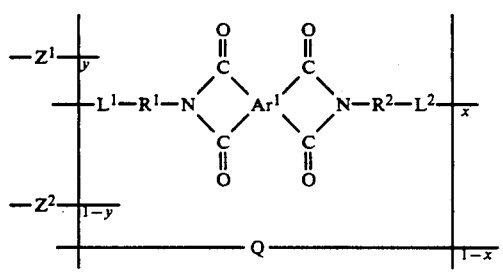

(I)

wherein $Ar^1$ represents a tetravalent aromatic group having 6 to about 20 carbon atoms, $R^1$ and $R^2$ each independently represents an alkylene group having 2 to about 12 carbon atoms, $L^1$ and $L^2$ represent O or C=O; when $L^1$ and $L^2$ are O, $Z^1$ and $Z^2$ each independently represents an aromatic or aliphatic dicarbonyl group having about 4 to about 12 carbon atoms and Q represents an alkylenedioxy group having 2 to about 25 carbon atoms or

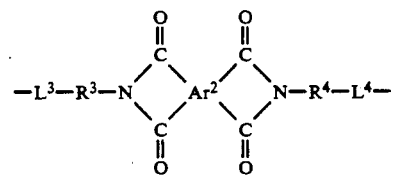

wherein $Ar^2$ represents a tetravalent aromatic group having 6 to about 20 carbon atoms that may be the same as or different from $Ar^1$, $R^3$ and $R^4$ each independently represents an alkylene group having 2 to about 12 carbon atoms; and $L^3$ and $L^4$ are O; or when $L^1$ and $L^2$ are C=O, $Z^1$ and $Z^2$ each independently represents an alkylenedioxy group having 2 to about 25 carbon atoms and Q represents an aromatic or aliphatic dicarbonyl group having about 4 to about 12 carbon atoms or

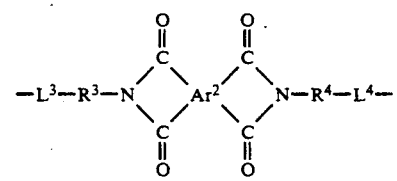

wherein $Ar^2$, $R^3$ and $R^4$ are as defined above, and $L^3$ and $L^4$ are C=O; x represents the mole fraction of the dioxy or dicarbonyl component of the polyester-imide that contains the tetravalent aromatic group $Ar^1$, and y represents the mole fraction of the dioxy or dicarbonyl component of the polyester-imide that contains $Z^1$, wherein x is 0.05 to 1 and y is 0 to 0.95.

In one embodiment of the invention, the charge-transport layer of the electrophotographic element comprises the polyester-imide. In another embodiment, the charge-transport layer further comprises an electron-transport agent dispersed in the polyester-imide.

DETAILED DESCRIPTION OF THE INVENTION

The imide structures in the polyester-imides of the present invention contain aromatic groups $Ar^1$ and optionally $Ar^2$, which can be tetravalent benzene, naphthalene, or perylene nuclei. Preferred imides are 1,2,4,5-benzenetetracarbonyl-dimides

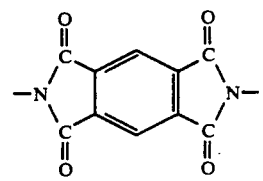

1,4,5,8-naphthalenetetracarbonyl-dimides

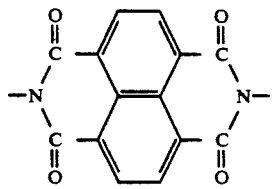

and 3,4,9,10-perylenetetracarbonyl-dimides

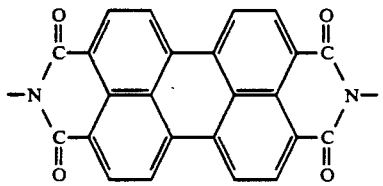

Especially preferred are naphthalenetetracarbonyl-dimides and perylenetetracarbonyl-dimides. In addition to the four carbonyl groups, $Ar^1$ and $Ar^2$ can contain other substituents such as alkyl, alkoxy, halo, and the like.

When $L^1$ and $L^2$ are O, the groups $Z^1$ and $Z^2$ can be aromatic dicarbonyl groups such as isophthaloyl, terephthaloyl, 1,4-naphthalenedicarbonyl, and the like. The aromatic dicarbonyl groups can be further substituted with groups such as alkyl, alkoxy, halo, and the like. $Z^1$ and $Z^2$ can also be aliphatic dicarbonyl groups such as succinoyl, adipoyl, suberoyl, sebacoyl, and the like. The aliphatic groups can be branched, as in octylsuccinoyl, 2,4-dimethylglutaroyl, 3,3-dimethylglutaroyl, and the like. Dicarbonyl groups $Z^1$ and $Z^2$ which are aromatic are preferred. Especially preferred are isophthaloyl, terephthaloyl, and 5-t-butyl-isophthaloyl.

When $L^1$ and $L^2$ are O, Q is an alkylenedioxy group Q having an aliphatic chain connecting the oxygen atoms, for example, ethylenedioxy, 1,3-propylenedioxy, 1,6-hexylenedioxy, and the like. The group can be branched, such as 1,2-propylenedioxy, 1,2-butylenedioxy, and the like, or cyclic, as 1,4-cyclohexanedioxy and the like. The alkylenedioxy group Q can also contain an aromatic nucleus, for example, 1,2-benzenedimethylenoxy and 1,3-benzenedimethylenoxy, or olefinic or acetylenic unsaturation, or a divalent O or S atom. Preferred alkylenedioxy groups are ethylenedioxy and 1,2-propylenedioxy; ethylenedioxy is especially preferred.

When $L^1$ and $L^2$ are C=O, the alkylenedioxy groups $Z^1$ and $Z^2$ can be as described above for Q, and the dicarbonyl group Q can be aromatic or aliphatic as described above for $Z^1$ and $Z^2$, aromatic dicarbonyl groups being preferred.

Alkylene groups $R^1$ and $R^2$ can have straight chains, for example, ethylene, 1,3-propylene, 1,4-butylene, 1,5-pentylene, 1,8-octylene, and the like. The alkylene groups $R^1$ and $R^2$ can also be branched, such as 1,2-propylene, 1,2-butylene, 2-methyl-1,2-propylene, and the like, or cyclic, such as 1,4-cyclohexylidene and the like. $R^1$ and $R^2$ can also contain an aromatic nucleus, or olefinic or acetylenic unsaturation, or a divalent O or S atom. In a preferred embodiment, $R^1$ and $R^2$ are the same. In a more preferred embodiment, $R^1$ and $R^2$ are both pentylene.

When the group Q contains a tetravalent aromatic group $Ar^2$, the alkylene groups $R^3$ and $R^4$ are as described above for $R^1$ and $R^2$. In a preferred embodiment, $R^3$ and $R^4$ are the same.

The polyester-imides of the present invention, which have a weight-average molecular weight of about 5000 to about 250,000, preferably about 25,000 to about 100,000, are prepared by condensation of at least one diol compound with at least one dicarboxylic acid ester, anhydride, or chloride compound. The diimide structure containing the tetravalent aromatic nucleus can be incorporated into the diol compound by reaction of the corresponding tetracarbonyl dianhydride, for example, 1,2,4,5-benzenetetracarboxylic dianhydride, 1,4,5,8-naphthalenetetracarboxylic dianhydride, or 3,4,9,10-perylenetetracarboxylic dianhydride, with an aminoalcohol. The resulting diol is then condensed with a dicarboxylic acid derivative by means well-known in the art, such as interfacial, solution, or melt polymerization.

Alternatively, the tetracarbonyl dianhydride can be reacted with an aminoacid to produce a diimide-dicarboxylic acid compound, which is then polymerized with a diol compound to give a polyester-imide.

Mixtures of diols and of dicarboxylic acid compounds can be employed to produce polyester-imides in accordance with the present invention. The diimide structure can be in either the diol reactant or in the dicarboxylic acid derivative, or in both. The mole fraction x of the component of the polyester-imide that contains the tetravalent aromatic group $Ar^1$ can be from 0.05 to 1, preferably from 0.20 to 0.90, and most preferably from 0.50 to 0.80.

The photoconductive elements of this invention can employ polymeric film or sheet materials as a nonconducting support. Preferred polymers include polyesters such as polyethylene terephthalate and the like.

The support layer is associated with an electrically conductive layer. Various electrically conductive layers that are known in the electrophotographic art can be employed. For example, the conductive layer can be a metal foil which is conventionally laminated onto the support layer. Suitable metal foils include those comprised of aluminum, zinc, copper, and the like. Vacuum deposited metal layers, such as silver, chromium, nickel, aluminum, and the like are presently preferred. The thickness of a vapor deposited metal layer can be in the range of about 100 to about 2,000 Angstroms. The conductive layer can also be comprised of particles of a conductor or semiconductor dispersed in a binder. For example, a conducting layer can be comprised of compositions of protective inorganic oxide and about 30 to 70 weight percent of conductive metal particles such as a vapor deposited conductive cermet layer as described in U.S. Pat. No. 3,880,657. See also the teachings of U.S. Pat. No. 3,245,833 relating to conductive layers employed with barrier layers. Organic conductive layers can be employed, such as a layer comprised of a sodium salt of a carboxy ester lactone of maleic anhydride and a vinyl acetate polymer as taught in U.S. Pat. Nos. 3,007,901 and 3,262,807. If desired, the support layer and the conductive layer can be combined into a single structure. For example, metal plates can be used such as those comprised of aluminum, copper, zinc, brass and galvanized metals.

A barrier layer is optionally but preferably coated over the conductive layer. A barrier layer is conveniently applied to a conductive layer using a coating composition of a polymer in a volatile solvent, that is, one that is evaporatable at temperatures below about 50° C.

Examples of suitable solvents include aromatic hydrocarbons, such as benzene, toluene, xylene, and mesitylene; ketones, such as acetone, 2-butanone, and the like; ethers, either cyclic or acyclic, such as tetrahydrofuran, diethyl ether, and the like; halogenated aliphatic hydrocarbons, such as chloroform, methylene chloride, and ethylene chloride; alcohols, such as isopropyl alcohol, ethyl alcohol, and the like. Presently preferred solvents are chlorinated hydrocarbons.

Barrier layers can comprise a variety of film-forming organic polymers. Such polymers are preferably soluble in organic solvents and, in solid form, display high dielectric strength and electrically insulating properties. Barrier layers typically have a dry thickness in the range of about 0.01 to about 5 µm. Typical barrier layer materials include polymers such as cellulose nitrate, polyesters, copolymers of poly(vinyl pyrrolidone) and vinylacetate, and various vinylidene chloride-containing polymers, including two, three, and four component polymers prepared from a polymerizable blend of monomers or prepolymers containing at least 60 percent by weight of vinylidene chloride. Representative vinylidene chloride-containing polymers include vinylidene chloride-methyl methacrylateitaconic acid terpolymers, as disclosed in U.S. Pat. No. 3,143,421. Various vinylidene chloride-containing hydrosol polymers which may be used include tetrapolymers of vinylidene chloride, methyl acrylate, acrylonitrile and acrylic acid, as disclosed in U.S. Pat. No. 3,640,708. Other useful vinylidene chloride-containing copolymers include poly(vinylidene chloride-methyl acrylate), poly(vinylidene chloride-methacrylonitrile), poly(vinylidene chloride-acrylonitrile). Other barrier materials include the so-called tergels described in Nadeau U.S. Pat. No. 3,228,770.

In addition to organic polymers, inorganic materials can be utilized for the formation of barrier layers. Silicon dioxide, for example, can be applied to a conductive support by vacuum deposition.

A charge-generation layer (CGL) is preferably applied over the barrier layer. The CGL can be applied by vacuum vapor deposition. Preferably, the CGL is comprised of a charge-generation material which is dispersed in a polymeric binder, including a polyester-imide of Formula (I).

A charge-generation layer can have a thickness which varies over a wide range. Typical thicknesses are in the range of about 0.05 to about 5 µm. As those skilled in the art will appreciate, as layer thickness increases, a greater proportion of incident radiation is absorbed by the layer, but the likelihood increases of trapping a charge carrier, which then does not contribute to image formation. Thus, an optimum thickness for a given charge-generation layer can constitute a balance between these competing influences.

Materials suitable for use in the CGL include inorganic and organic, including metallo-organic and polymeric, materials. Inorganic charge-generation materials include, for example, zinc oxide, lead oxide, selenium, and the like. Various organic compounds can be used, including phthalocyanine pigments such as titanyl tetrafluorophthalocyanine, described in U.S. Pat. No. 4,701,396, and bromoindiumphthalocyanine, described in U.S. Pat. Nos. 4,666,802 and 4,727,139.

A variety of polymeric binders can be used in the CGL. Suitable polymers include, for example, butadiene copolymers, such as styrene-butadiene copolymers, polyvinyl toluene-styrene copolymers; silicone resins; styrene-alkyd resins; silicone-alkyd resins; soya-alkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methyl methacrylate), poly(n-butyl methacrylate), poly(isobutyl methacrylate), etc.; polystyrene; nitrated polystyrene; polymethylstyrene; polyisobutylene polymers; polyesters, such as poly[4,4'-norbornylidene)diphenylene terephthalate-co-azelate] and polyethylene 5-t-butylisophthalate; phenol formaldehyde resins; ketone resins; polyimides; polycarbonates, such as bisphenol A polycarbonates; polythiocarbonates; poly[ethylene-co-isopropylidene-2,2-bis(ethylene-oxyphenylene) terephthalate]; cellulose esters such as cellulose nitrate; poly(vinyl-pyrrolidone); copolymers of vinyl haloarylates and vinyl acetate, such as poly(vinyl-m-bromobenzoate-co-vinyl acetate); chlorinated polyolefins, such as chlorinated polyethylene, and, in accordance with the present invention, polyester-imides of formula (I).

The CGL is applied from a charge-generation coating composition. In addition to the charge-generation material, binder polymer, and solvent, the coating composition may contain optional additives, such as surfactants, levelers, plasticizers, sensitizers, and the like. The solids comprising a CGL on a 100 weight percent total basis typically comprise 1 to about 70 weight percent of charge-generation material, 0 to about 99 weight percent of polymeric binder, and 0 to about 5 weight percent of total additives. Preferably the coating composition contains from about 6 to about 15 weight percent of solids, the balance being solvent. Suitable solvents are those identified above in relation to the barrier layer.

The charge-generation layer is preferably overcoated with a charge-transport layer, or CTL, which can be of the p- or n-type. The charge-transport layer is employed in a multiactive, or multilayer, electrophotographic element of the invention. Typically, a charge-transport layer has a thickness in the range of about 3 to about 30 µm, although thicker and thinner charge transport-layers can be employed.

The charge-transport agents employed in charge-transport layers preferentially accept and transport either positive charges (holes) or negative charges (electrons), although materials are known which will transport both positive and negative charges. Those exhibiting a preference for conduction of positive charge carriers are called p-type charge-transport, or hole-transport, materials, and those exhibiting a preference for the conduction of negative charges are called n-type charge-transport or electron-transport, agents. In a preferred embodiment of the present invention, the charge-transport agent is an electron-transport agent.

Various n-type or p-type organic compounds can be used in the CTL. Representative p-type charge transport compounds include:

1. Carbazoles including carbazole, N-ethylcarbazole, N-isopropylcarbazole, N-phenylcarbazole, halogenated carbazoles, various polymeric carbazole materials such as poly(vinylcarbazole), halogenated poly(vinylcarbazole), and the like.

2. Arylamines including monarylamines, diarylamines, triarylamines and polymeric arylamines. Specific arylamine organic photoconductors include the nonpolymeric triphenylamines illustrated in U.S. Pat.

No. 3,180,730; the polymeric triarylamines described in U.S. Pat. No. 3,240,597; the triarylamines having at least one of the aryl radicals substituted by either a vinyl radical or a vinylene radical having at least one active hydrogen-containing group, as described in U.S. Pat. No. 3,567,450; the triarylamines in which at least one of the aryl radicals is substituted by an active hydrogen-containing group, as described by U.S. Pat. No. 3,658,520; and tritolylamine.

3. Polyarylalkanes of the type described in U.S. Pat. Nos. 3,274,000; 3,542,547; and 3,615,402.

4. Strong Lewis bases such as aromatic compounds, including aromatically unsaturated heterocyclic compounds free from strong electron-withdrawing groups. Examples include tetraphenylpyrene, 1-methylpyrene, perylene, chrysene, anthracene, 2-phenylnaphthalene, azapyrene, fluorene, 1-ethylpyrene, 2,3-benzochrysene, 3,4-benzopyrene, 1,4-bromopyrene, polyvinyltetracene, and polyvinylperylene.

5. Hydrazones including the dialkylsubstituted aminobenzaldehyde (diphenylhydrazones) of the U.S. Pat. No. 4,150,987; alkylhydrazones and arylhydrazones as described in U.S. Pat. Nos. 4,554,231; 4,487,824; 4,481,271, 4,456,671; and 4,423,129, which are illustrative of the p-type hydrazones.

Representative n-type charge-transport agents include strong Lewis acids, such as organic compounds containing one or more aromatic groups with electron-withdrawing substituents or aromatically unsaturated heterocyclic groups. These are useful because of their electron-accepting capability. Typical electron-withdrawing substituents include cyano and nitro; sulfonyl; halogens such as chlorine, bromine and iodine; ketone groups; ester groups, acid anhydride groups; and other groups such as quinone groups. Aromatic Lewis acids having electron-withdrawing substituents include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-o-toluene, 4,6-dichloro-1,3-dinitrobenzene, 4,6-dibromo-1,3-dinitrobenzene, p-dinitrobenzene, chloranil, bromanil, 2,4,7-trinitro-9-fluorenone, 2,4,5,7-tetranitrofluorenone, trinitroanthracene, dinitroacridine, tetracyanopyrene, dinitroanthraquinone, and mixtures thereof. Complexes of 2,4,6-trinitro-9-fluorenone and poly(vinylcarbazole) are also useful n-type charge-transport agents.

Preferred electron-transport agents are the anthraquinone bis-cyanoimine compounds described in U.S. Pat. No. 4,913,996, incorporated herein by reference. Other preferred electron-transport agents are the 4H-thiopyran 1,1-dioxide compounds disclosed in U.S. Pat. Nos. 4,514,481, 5,034,293, and 5,039,585, incorporated herein by reference.

In addition to the charge-transport agent, the CTL preferably contains a polymeric binder in which the charge-transport agent is dispersed. Polymeric binders such as those described above as charge-generation layer polymers can be used in the charge-transport layer. In accordance with the invention, the preferred binder in the CTL is a polyester-imide of formula (I). Where the charge-transport agent in the CTL is an electron-transport agent, it is particularly advantageous to use a polyester-imide of formula (I) as the binder because it enhances the mobility of electrons in the CTL without any adverse effect on any other electrophotographic properties of the element.

In addition to a charge transport agent and a binder, the charge transport layer coating composition may contain various optional additives, such as surfactants, levelers, plasticizers, and the like.

On a 100 weight percent total solids basis, the charge-transport layer comprises about 5 to about 60 weight percent charge-transport agent(s); about 40 to about 95 weight percent binder polymer; and about 0 to about 2 weight percent total additives. The charge-transport layer components are conveniently dissolved in a solvent to produce a charge-transport layer coating composition containing about 6 to 15 weight percent solids, the balance being solvent. Suitable solvents are as hereinabove described.

In another embodiment of the present invention, the CTL consists entirely of a polyester-imide of formula (I) without any additional electron-transport agent, in which embodiment the polyester-imide of formula (I) operates as both the binder and the electron-transport agent.

In the preceding discussion, the CGL is located between the conductive layer and the CTL. However, it will be appreciated that other layer configurations can be employed. For example, one can utilize the so-called "inverted multilayer configuration" wherein the CTL is positioned between the conductive layer and the CGL.

In an electrophotographic element of this invention, as can be seen in the preceding description, a polyester-imide of Formula (I) can be the polymeric binder in the charge-generation layer, and/or the charge-transport layer, if present, with the proviso that at least one of such layers utilizes a polyester-imide of formula (I) as a binder. Preferably, the polyester-imide of formula (I) is contained in the charge-transport layer.

Table I shows the structures of control binder polymers (A) and (B) and the binder polymers of the invention, (1), (2), (3), (4), and (5).

TABLE 1

BINDER POLYMERS

| Binder Polymer | Recurring Units |
|---|---|
| (A) | $-\overset{O}{\underset{\|}{C}}-\underset{\underset{C(CH_3)_3}{\|}}{\bigcirc}-\overset{O}{\underset{\|}{C}}-OCH_2CH_2O-$ |

TABLE 1-continued
BINDER POLYMERS
| Binder Polymer | Recurring Units |
|---|---|
| (B) | 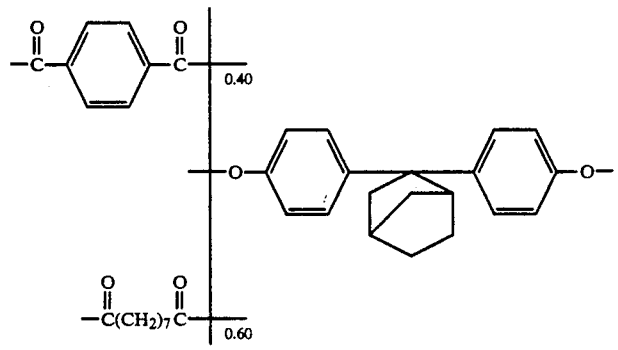 |
| (1) | 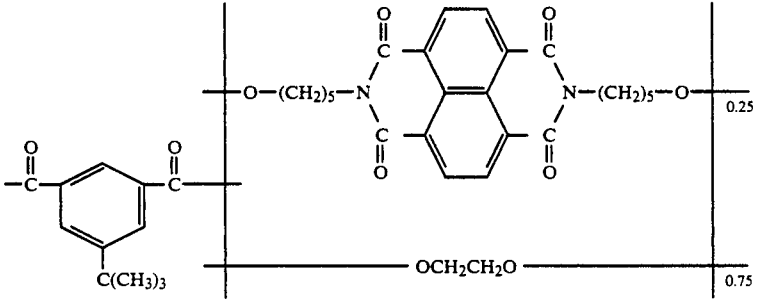 |
| (2) | 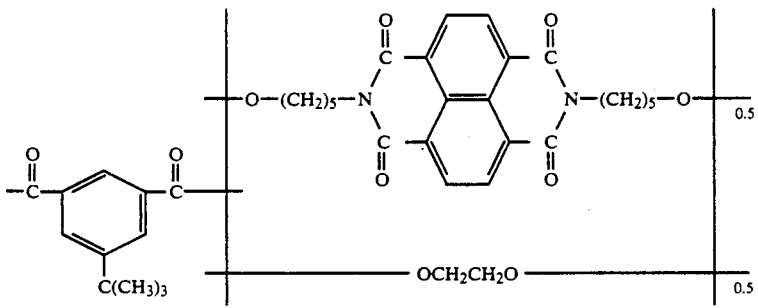 |
| (3) | 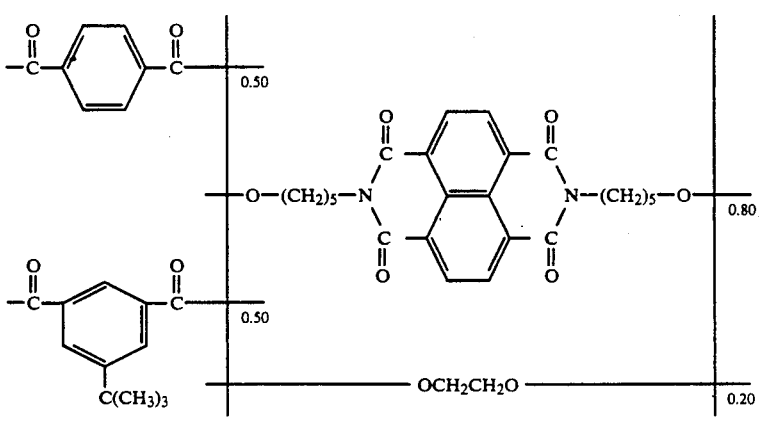 |
| (4) | |

TABLE 1-continued

BINDER POLYMERS

| Binder Polymer | Recurring Units |
|---|---|

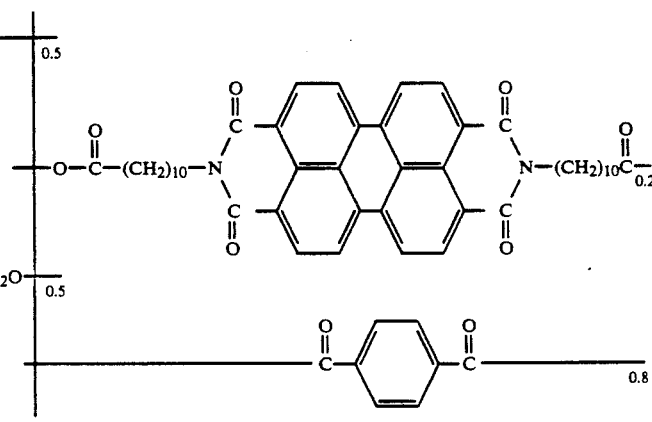

(5)

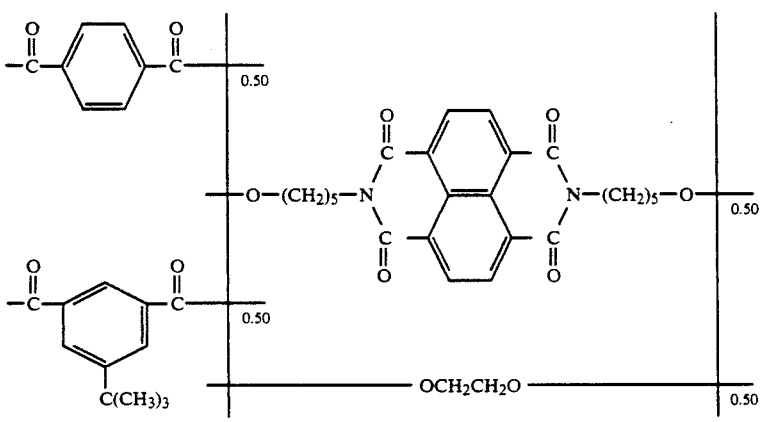

The following examples further illustrate the invention.

EXAMPLE 1

Synthesis of Binder Polymers

Polymer (A)

A mixture of 50 g (0.20 mole) of dimethyl 5-t-butylisophthalate and 15.5 g (0.25 mole) of ethylene glycol contained in a polymerization flask equipped with a Claisen head and a nitrogen inlet tube was heated to 200° C. under a nitrogen atmosphere to produce a homogeneous melt. The 200 ppm of titanium isopropoxide catalyst was added, and the temperature was slowly raised to 280° C. over several hours. Heating was continued until no further evolution of methanol could be detected. A mechanical stirrer was introduced into the flask, which was placed under vacuum. The mixture was stirred under vacuum at 280° C. for about two hours, then cooled to room temperature. The polymer was removed from the flask by dissolution in methylene chloride; the resulting solution was then poured into excess methanol to precipitate the product, which was collected by filtration. Polymer (A) had an inherent viscosity in methylene chloride of 0.60 dL/g, a glass transition temperature of 105° C., and a weight-average molecular weight of 62,000.

Polymer (1)

The method of preparation and isolation of polymer (A) was employed for polymer (1), except that a mixture of 21.9 g (0.05 mole) of 1,4,5,8-naphthalenetetracarbonyl-bis-(5-hydroxypentyl)imide and 9.3 g (0.15 mole) of ethylene glycol was used as the diol reactant. The resulting polymer (1) had an inherent viscosity in methylene chloride of 0.64 dL/g, a glass transition temperature of 120° C., and a weight-average molecular weight of 68,000.

Polymer (2)

The method used for polymer (A) was employed for polymer (2), except that an equimolar (0.10 mole) mixture of 43.8 g of the bis-hydroxypentylimide compound and 6.2 g of ethylene glycol was used as the diol reactant. The resulting polymer (2) had an inherent viscosity in methylene chloride of 0.68 dL/g, a glass transition temperature of 135° C., and a weight-average molecular weight of 72,000.

Polymer (3)

Polymer (3) was prepared from a mixture of 25 g (0.10 mole) of dimethyl 5-t-butylisophthalate, 19.4 g (0.10 mole) of dimethyl terephthalate, 70.1 g (0.16 mole) of 1,4,5,8-naphthalenetetracarbonyl-bis-(5-hydroxypentyl)imide, and 2.5 g (0.04 mole) of ethylene glycol, using the method employed for polymer (A). The resulting polymer (3) had an inherent viscosity in dichloromethane of 0.72 dL/g, a glass transition temperature of 145° C., and a weight-average molecular weight of 78,000.

Polymer (4)

Using the method employed for polymer (A), polymer (4) was prepared from a mixture of 31 g (0.16 mole) of dimethyl terephthalate, 30.3 g (0.04 mole) of 3,4,9,10- perylenetetracarbonyl-bis-(10-carboxydecyl)imide, 31.6 g (0.10 mole) of 4,4'-isopropylidenebis(phenoxyethanol), and 6.2 g (0.10 mole) of ethylene glycol. The resulting polymer (4) had an inherent viscosity in dichloromethane of 0.48 dL/g, a glass transition temperature of 98° C., and a weight-average molecular weight of 58,000.

Polymer (5)

Polymer (5) was prepared from the same reactants as used for polymer (3), but with a different molar ratio of the diol compounds. Polymer (5) had an inherent viscosity in methylene chloride of 0.66 dL/g, a glass transition temperature of 124° C., and a weight-average molecular weight of 72,500.

EXAMPLE 2

Preparation and Performance of Electrophotographic Elements

Multiactive electrophotographic elements containing separate charge-generation and charge-transport layers were prepared by the following procedure:

A thin conductive layer of aluminum was vacuum-deposited on a 178 μm-thick film of polyethylene terephthalate. The aluminum layer was overcoated by vacuum deposition with a barrier layer of silica having a thickness of about 500 angstroms. A CGL coating formulation was prepared by dispersing 2 parts by weight of titanyl tetrafluorophthalocyanine (described in U.S. Pat. No. 4,701,396) in a solution of 1 part by weight of a polymeric binder comprising a polyester formed from 4,4'-(2-norbornylidene)-diphenol and terephthalic acid:azelaic acid (40:60 molar ratio) (binder polymer (B) in Table I) in dichloromethane, ball milling the dispersion for 60 hours, and diluting with a mixture of dichloromethane and 1,1,2-trichloroethane (final weight ratio of dichloromethane:trichloroethane was 80:20) to achieve suitable coating viscosity. The dispersion was coated over the barrier layer and the solvent was evaporated, producing a CGL of about 1 μm thickness.

A series of charge-transport layers containing 45 weight percent of the electron-transport agent 2-t-butylanthraquinone bis-cyanoimine

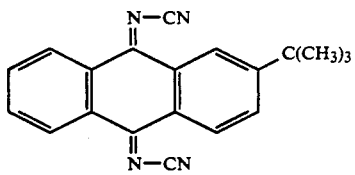

was prepared in various binder polymers: controls (A) and (B) and the polymers of the invention, (1), (2), and (3). One part by weight of solids in each of the CTL compositions was dissolved in 9 parts by weight of dichloromethane. A coating of each CTL solution was applied to the CGL with a doctor blade, then allowed to dry.

The thickness of each CTL, ranging from 11 to 15 μm, was determined from the measured capacitance of a test area, assuming a relative dielectric constant of 3.0 and neglecting the thickness of the CGL.

The electron mobility in the CTL of each element was determined by a standard time-of-flight method, using field strengths of $5 \times 10^4$ V/cm and $4 \times 10^5$ V/cm.

The electrophotographic sensitivity was evaluated by charging each electrophotographic element to a surface potential of 600 volts, exposing it through the outer surface of the CTL to a 15.5 erg/cm² flash at 820 nm, and measuring the voltage reached 0.5 second after the flash ($V_{0.5}$ sec). These values and the electron mobility values determined for each element are contained in Table II.

TABLE II

| Element | Binder Polymer in CTL | Mole Fraction x | $V_{0.5\ sec}$ (volts) | Electron Mobility (cm²/V-sec) at $5 \times 10^4$ V/cm | $4 \times 10^5$ V/cm |
|---|---|---|---|---|---|
| 1 (control) | (A) | 0 | 225 | $9.7 \times 10^{-9}$ | $8.5 \times 10^{-8}$ |
| 2 (control) | (B) | 0 | 155 | $3.0 \times 10^{-8}$ | $2.0 \times 10^{-7}$ |
| 3 | (1) | 0.25 | 177 | $2.6 \times 10^{-8}$ | — |
| 4 | (2) | 0.50 | 153 | $4.5 \times 10^{-8}$ | $2.9 \times 10^{-7}$ |
| 5 | (3) | 0.80 | 110 | $2.0 \times 10^{-7}$ | $1.1 \times 10^{-6}$ |

As shown by the data in Table II, elements 3, 4, and 5 containing binder polymers (1), (2), and (3), respectively, of the invention all exhibited superior discharge and much greater electron mobilities than control element 1, which contained polymer (A). The data show furthermore that there was a continuing improvement in these properties with increasing proportion of imide structure in the binder polymers of the invention.

Element 4, whose CTL binder polymer (2) had a mole fraction x of 0.50, had discharge properties comparable to that of control element 2, which contained polymer (B). Electron mobilities, however, were higher in element 4 than in element 2. Element 5, in which the mole fraction x in the polymer (3) was 0.80, showed a large advantage in both discharge rate and electron mobility over control element 2.

EXAMPLE 3

Electron Mobility Measurements in Electrophotographic Elements

The support bearing the CGL was constructed as follows:

A support consisting of a 100 μm-thick sheet of poly(ethylene terephthalate) was coated with a conductive layer of nickel and overcoated with a barrier layer of poly[ethylene-co-2,2-dimethyl-1,3-propylene (55:45) terephthalate]. Its optical density was 0.4, indicating a thickness of between 150 and 200 Angstroms. The barrier layer was coated from an extrusion hopper using a 1.5 weight percent solution of the polymer in dichloromethane. The dry thickness of that layer was approximately 0.1 μm. The CGL consisted of amorphous selenium, approximately 0.3 μm thick, prepared by vacuum evaporation of selenium pellets (99.999% pure, obtained from Aldrich Chemical Company).

The charge transport layers were prepared as in Example 2, except that the ratio of anthraquinone bis-cyanoimine electron-transport agent to binder polymer in the charge-transport layer was 40:60. Electron mobility was determined as previously described, using a field strength of $4 \times 10^5$ V/cm. Measurement of the electron mobility in an element of the invention whose CTL had a thickness of 4 μm and contained the binder polymer (1) yielded a value of $1.6 \times 10^{-7}$ cm²/V-sec. For a second element whose CTL was 8.5 μm thick and contained the binder polymer (4), the determined electron mobility was $2.2 \times 10^{-7}$ cm$^2$/V-sec. Thus, both elements of the invention displayed good electron mobility properties.

EXAMPLE 4

Electron Mobility Measurements in Electrophotographic Elements Containing Various Electron-Transport Agents.

On a CGL/support structure prepared as described in Example 2 was applied a series of CTLs containing the following electron-transport agents: 2-t-butylanthraquinone bis-cyanoimine, which was used in Example 2; 4-dicyanomethylene-2-phenyl-6-(4-tolyl)-4H-thiopyran-1,1-dioxide; and 4-dicyanomethylene-2,6-di-t-butyl-4H-thiopyran-1,1-dioxide. The structure of the two latter compounds are shown below:

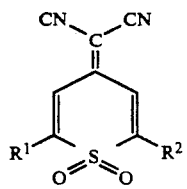

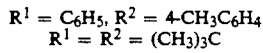

Formulations of each of the aforementioned electron-transport agents in the control binder polymer (B) and in binder polymer (5) of the invention were prepared and coated; each coating pair contained the agent at the same weight percent concentration. Electron mobilities in the CTL of each element at a field strength of $4 \times 10^5$ V/cm were determined as described in Example 2. The results are given in Table III below.

The data recorded in Table III show that the electron mobility was greater in the element containing the polymer of the invention than it was in the element containing the control polymer for each of the electron-transport agents. Thus, the binder polymers of the present invention provide a beneficial result with a variety of electron-transport agents.

contained no monomeric electron-transport agent and consisted solely of the polymer (3) of the invention. The element was charged to a surface potential of 300 volts and exposed to continuous irradiation of 0.85 erg/cm$^2$-sec at 830 nm. The time required for discharge to 150 volts was determined to be 11 seconds. This demonstrates the electrophotographic sensitivity of an element whose charge-transport layer contains no monomeric electron-transport agent but consists only of a polyester-imide polymer of the invention.

The invention has been described in detail with particular reference to preferred embodiments thereof, but it will be understood that variations and modifications can be effected within the spirit and scope of the invention.

What is claimed is:

1. An electrophotographic element containing a polyester-imide that comprises a dioxy component and a dicarbonyl component, one of said components containing an aromatic tetracarbonyldiimide group, and that comprises the condensation product from a mixture comprising a diol compound and a dicarboxylic acid ester, anhydride, or chloride compound and has the formula

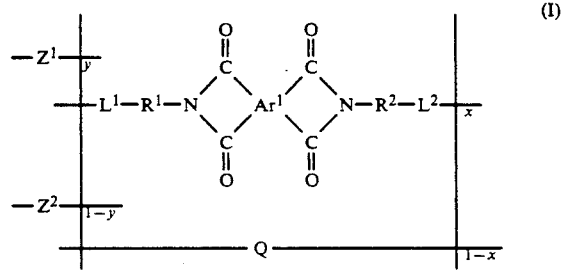

wherein Ar$^1$ represents a tetravalent aromatic group having 6 to about 20 carbon atoms, R$^1$ and R$^2$ each independently represents an alkylene group having 2 to about 12 carbon atoms, L$^1$ and L$^2$ represent O or C=O; when L$^1$ and L$^2$ are O, Z$^1$ and Z$^2$ each independently represents an aromatic or aliphatic dicarbonyl group

TABLE III

| Element | Binder Polymer in CTL | Electron-Transport Agent | Wt. % Electron-Transport Agent in CTL | Electron Mobility (cm$^2$/V-sec) at $4 \times 10^{-5}$ V/cm |
| --- | --- | --- | --- | --- |
| 1 (Control) | (B) | 2-t-butylanthraquinone bis-cyanoimine | 30 | $3.7 \times 10^{-8}$ |
| 2 | (5) | 2-t-butylanthraquinone bis-cyanoimine | 30 | $1.1 \times 10^{-7}$ |
| 3 (Control) | (B) | 4-dicyanomethylene-2-phenyl-6-(4-tolyl)-4H-thiopyran-1,1-dioxide | 35 | $2.7 \times 10^{-7}$ |
| 4 | (5) | 4-dicyanomethylene-2-phenyl-6-(4-tolyl)-4H-thiopyran-1,1-dioxide | 34.4 | $6.8 \times 10^{-7}$ |
| 5 (Control) | (B) | 4-dicyanomethylene-2,6-di-t-butyl-4H-thiopyran-1,1-dioxide | 29.2 | $4.8 \times 10^{-8}$ |
| 6 | (5) | 4-dicyanomethylene-2,6-di-t-butyl-4H-thiopyran-1,1-dioxide | 29.2 | $2.3 \times 10^{-7}$ |

EXAMPLE 5

Preparation and Performance of Electrophotographic Element with CTL Containing only Binder Polymer An electrophotographic element was prepared as in Example 2, except that the CTL, which was 7 μm thick, having about 4 to about 12 carbon atoms and Q represents an alkylenedioxy group having 2 to about 25 carbon atoms or

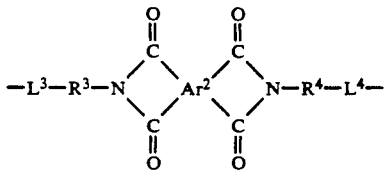

wherein $Ar^2$ represents a tetravalent aromatic group having 6 to about 20 carbon atoms that may be the same as or different from $Ar^1$, $R^3$ and $R^4$ each independently represents an alkylene group having 2 to about 12 carbon atoms; and $L^3$ and $L^4$ are O; or when $L^1$ and $L^2$ are C=O, $Z^1$ and $Z^2$ each independently represents an alkylenedioxy group having 2 to about 25 carbon atoms and Q represents an aromatic or aliphatic dicarbonyl group having about 4 to about 12 carbon atoms or

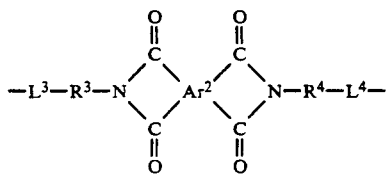

wherein $Ar^2$, $R^3$ and $R^4$ are as defined above, and $L^3$ and $L^4$ are C=O; x represents the mole fraction of the dioxy or dicarbonyl component that contains the tetravalent aromatic group $Ar^1$, and y represents the mole fraction of the dioxy or dicarbonyl component of said polyester-imide that contains $Z^1$, wherein x is 0.05 to 1 and y is 0 to 0.95.

2. An element of claim 1 wherein said polyester imide has a weight-average molecular weight of about 5,000 to about 250,000.

3. An element of claim 2 wherein said polyester-imide has a weight-average molecular weight of about 25,000 to about 100,000.

4. An element of claim 1 wherein said mole fraction x is 0.20 to 0.90.

5. An element of claim 4 wherein said mole fraction x is 0.50 to 0.80.

6. An element of claim 1 that comprises a conductive support, or a support with a conductive layer adhered thereto, a barrier layer adhered to the conductive layer, and a charge-generation layer adhered to the barrier layer.

7. An element of claim 6 that further comprises a charge-transport layer adhered to said charge-generation layer.

8. An element of claim 7 wherein said charge-transport layer comprises said polyester-imide.

9. An element of claim 8 wherein said charge-transport layer further comprises an electron-transport agent dispersed in said polyester-imide.

10. An element of claim 1 wherein said tetravalent aromatic groups $Ar^1$ and $Ar^2$ are benzene, naphthalene, or perylene groups.

11. An element of claim 10 wherein said aromatic groups are naphthalene groups.

12. An element of claim 1 wherein said dicarbonyl group is aromatic.

13. An element of claim 1 wherein Q is an alkylenedioxy group having 2 to about 12 carbon atoms and $Z^1$ and $Z^2$ are aromatic dicarbonyl groups having 8 to about 12 carbon atoms.

14. An element of claim 13 wherein said alkylenedioxy group is ethylenedioxy or 1,2-propylenedioxy and said aromatic dicarbonyl groups are isophthaloyl, 5-t-butyl-isophthaloyl, or terephthaloyl.

15. An element of claim 1 wherein Q is an aromatic dicarbonyl group having 8 to about 12 carbon atoms and $Z^1$ and $Z^2$ are alkylenedioxy groups having 2 to about 25 carbon atoms.

16. An element of claim 1 wherein $R^1$ is the same as $R^2$ and $R^3$ is the same as $R^4$.

17. An element of claim 16 wherein $R^1$ and $R^2$ are 1,5-pentylene.

18. An element of claim 9 wherein said electron-transport agent is an anthraquinone bis-cyanoimine compound.

19. An element of claim 9 wherein said electron-transport agent is a 4H-thiopyran-1,1-dioxide compound.

* * * * *